United States Patent [19]
Maeda

[11] 4,033,196
[45] July 5, 1977

[54] TIMING BELT TENSIONER
[75] Inventor: Yorishige Maeda, Toyota, Japan
[73] Assignee: Toyota Jidosha Kogyo Kabushiki Kaisha, Japan
[22] Filed: July 6, 1976
[21] Appl. No.: 702,579
[30] Foreign Application Priority Data
  Nov. 26, 1975  Japan .............. 50-159922
[52] U.S. Cl. .................. 74/242.11 R; 74/242.15 R
[51] Int. Cl.² ...................... F16H 7/12; F16H 7/10
[58] Field of Search ........... 74/242.11 C, 242.11 R, 74/242.15 R

[56]         References Cited
        UNITED STATES PATENTS

| | | | |
|---|---|---|---|
| 660,570 | 10/1900 | Green | 74/242.11 R |
| 1,577,103 | 3/1926 | Brown | 74/242.1 R |
| 3,142,193 | 7/1964 | Polko et al. | 74/242.11 C |
| 3,430,507 | 3/1969 | Hurst et al. | 74/242.15 R |
| 3,924,483 | 12/1975 | Walker et al. | 74/242.11 R |

FOREIGN PATENTS OR APPLICATIONS
912,523  12/1962  United Kingdom ........ 74/242.11 R Primary Examiner—Leonard H. Gerin
Attorney, Agent, or Firm—Spensley, Horn and Lubitz

[57]           ABSTRACT

A timing belt tensioner for an internal combustion engine comprising a base plate pivotally mounted about one end of the base plate to the front of the engine, a first arcuous slot formed in the base plate and extending along an arc having its center of curvature at the pivot axis of the base plate, a cylindrical tensioner bearing holder disposed on the base plate, a tensioner bearing rotatably coupled to the bearing holder, a second arcuous slot in the bearing holder corresponding to the first arcuous slot in the base plate, and a bolt extending through the first and second arcuous slot for fixing the position of the timing belt tensioner on the engine.

5 Claims, 5 Drawing Figures

TIMING BELT TENSIONER

BACKGROUND OF THE INVENTION

1. Field of the Invention

The present invention relates to timing belt tensioners and more particularly to adjustable timing belt tensioners.

2. Prior Art

In an overhead cam shaft engine or a high cam shaft engine which utilizes a timing belt, a timing belt tensioner is provided between the crank shaft pulley and the cam shaft pulley for the purpose of elminating any slack in the timing belt.

In the prior art there exists timing belt tensioners such as that shown in FIG. 1. Timing belt tensioner of FIG. 1 includes a base plate 1 to be mounted on the front surface of an engine cylinder block (not shown). One half of the base plate 1 comprises a plate and the other half comprises a hub 1A formed thereon for holding a tensioner bearing 2. The plate portion has a hole 1a and a slot 1b provided therein. The slot 1b is for adjusting the position of the base plate 1 when mounting it to the front surface of a cylinder block (not shown), and for inserting a tightening bolt (not shown) therein. Slot 1b is an arcuous slot whose center of curvature is the center of the hole 1a.

To mount the base plate 1 to the cylinder block, first a tightening bolt is inserted through hole 1a into a screw hole provided in the front surface of the cylinder block. Next, using a spring, the tension bearing 2 on hub 1A is pressed against the timing belt (not shown) at a desired pressure. Finally a second tightening bolt is inserted through slot 1b into the screw hole provided in the front surface of the cylinder block. However, before tightening the bolt which has been inserted into slot 1b, the base plate must be adjusted to a mounting position by rotating the plate at a desired angle parallel with the plate surface and with hole 1a at the center of rotation. The bolt in arcuous slot 1b is then tightened into the screw hole to firmly hold the base plate 1 in place.

The primary problem of the prior art timing belt tensioners of FIG. 1 is that since the mounting positon of plate 1 and the position of plate 2 are at a distance and a force is applied to bearing 2, the force applied to bearing 2 is transmitted back to base plate 1 as twisting and bending moments thereby causing base plate 1 to bend slightly. As a result, the axial line of the tensioner bearing cannot maintain a parallel relationship with the timing belt surface thereby causing the timing belt to become slightly twisted. As a final result, since the timing belt is slightly twisted it will generate vibration while the engine is in operation thereby shortening the life of the timing belt.

A second problem with the prior art tensioner of FIG. 1 is that in order to prevent base plate from being slightly bent, the base plate must be made stronger by increasing the thickness of the plate. The resulting increase in thickness and accordingly weight, necessitates enlargement of the installation space on the cylinder block as well as an increase in the cost of manufacturing of the timing belt tensioner. A particularly undesirable aspect associated with such a large installation space is that various problems arise in connection with the designing of the placement of other parts which must be installed on the front surface of the cylinder block.

SUMMARY OF THE INVENTION

Accordingly, it is a general object of the present invention to provide a timing belt tensioner which is not subject to twisting or bending moments transmitted from the timing belt.

It is another object of the present invention to provide a timing belt tensioner which is lightweight and small in size.

It is still another object of the present invention to provide a timing belt tensioner which does not interfere with the installation of other parts on the front surface of the cylinder block.

In keeping with the principals of the present invention, the objects are accomplished by a timing belt tensioner for an internal combustion engine comprising the unique combination of a base plate pivotally mounted about one end to the front of the engine, a first slot formed in the base plate, a tensioner bearing holder disposed on the base plate, a tensioner bearing coupled to the bearing holder, a second slot in the bearing holder over the first slot, and a bolt extending through the first and second slots for fixing the postion of the timing belt tensioner on the engine, said first and second slots being shaped so as to permit the base plate and tensioner bearing holder to move relative to the bolt means extending through said first and second slots and along an arc having its center of curvature at the pivot axis. Since the tensioner bearing is positioned on an arc having its center of curvature at the pivot axis of the base plate, the base plate is not subject to twisting or bending moments transmitted from the timing belt.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DESCRIPTION OF THE INVENTION

Figure 2:
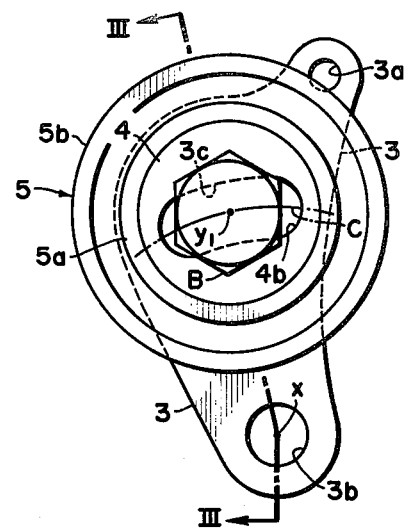
FIG. 2 is a plane view of a timing belt tensioner in accordance with the teachings of the present invention.
Figure 3:
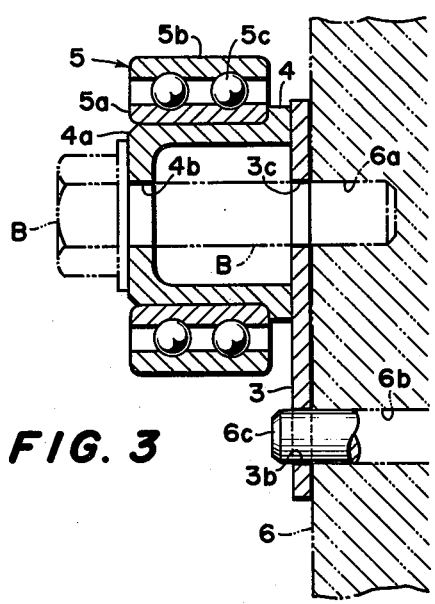
FIG. 3 is a cross sectional view taken along lines III — III of FIG. 2.
Figure 4:
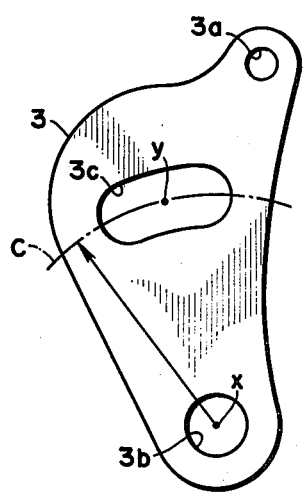
FIG. 4 is a plane view of the base plate of the embodiment of FIG. 1.
Figure 5:
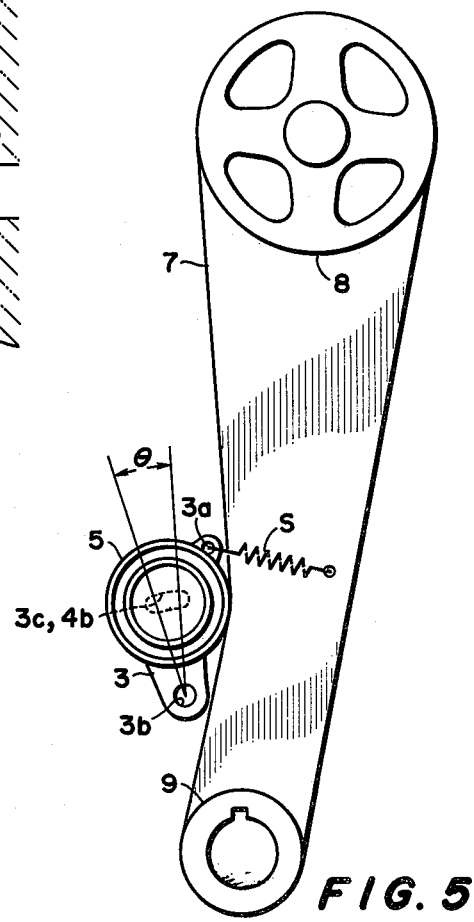
FIG. 5 illustrates a timing belt tensioner in accordance with the teachings of the present invention as it appears on the front surface of a cylinder block.

Referring to FIGS. 2, 3 and 4, shown therein is a timing belt tensioner in accordance with the teachings of the present invention. The timing belt tensioner of the present invention includes a base plate 3, a cylindrical tensioner bearing holder 4 mounted on plate 3. A tensioner bearing 5 is coupled to the outer circumference of bearing holder 4. The inner ring 5a of tensioner bearing 5 is unrotatably coupled to the outer circumference of bearing holder 4. The outer ring 5b of bearing 5 is rotatably coupled to inner ring 5a via ball bearings 5c.

Base plate 3 as shown in FIG. 4 is formed from thin metal plate. At one end of plate 3 is provided a small diameter hole 3a and at the other end is provided a pin insertion hole 3b. An arcuous slot 3c is provided in base plate 3 between holes 3a and 3b such that the slot 3c extends a predetermined distance along an arc drawn from the center of hole 3b.

Cylindrical tension bearing holder 4 includes an end plate member 4a. At the center of end plate member 4a the bearing holder 4 is provided an arcuous slot 4b. Bearing holder 4 and base plate 3 are separately fabricated and then joined one to the other by conventional means such as for example, welding. At the time of welding, the center of arcuous slot 3c on plate 3 and the center of arcuous slot 4b in holder 4 must be aligned. To mount the timing belt tensioner to the cylinder block, first insert hole 3b of base plate 3 over pin 6c driven into hole 6b in cylinder block 6. Insert tightening bolt B into slot 4b provided in bearing holder 4 and into slot 3c of base plate 3. Screw Bolt into hole 6a provided in cylinder block 6 until bolt B lightly engages with end plate member 4a of bearing holder 4 thereby lightly fixing base plate 3 and bearing holder 4 to cylinder block 6. Connect spring S between a point on the cylinder block 6 and hole 3a thereby pressing outer ring 5b of bearing 5 against belt 7.

In order to set the tension on the timing belt and to remove the slack, rotate plate 3 through an angle 0 about pin insertion hole 3b. After the axial location of bearing 5 has been established, tighten bolt B by screwing it firmly into hole 6a provided in cylinder block 6 until it firmly engages with surface 4a of bearing holder 4.

Figure 1:
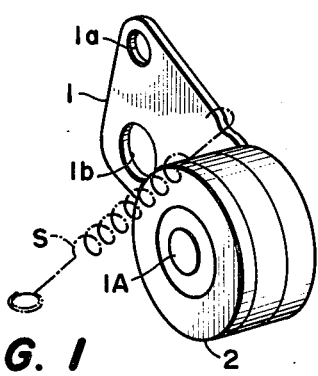
FIG. 1 is a perspective view of a prior art timing belt tensioner.

Accordingly, the timing belt tensioner of the present invention as described hereinabove has the following benefits:

1. Inasmuch as adjustment slots 3c and 4b are provided at a location corresponding to the axial center of bearing 5, there is no necessity for providing a slot 1b in plate 1 as shown in FIG. 1, thereby enabling the base plate to be small in size.

2. Furthermore, since the axial center of bearing 5 corresponds to the mounting position of base plate 3, any reaction force from timing belt 7 to bearing 5 is directed to the axial center of bearing 5. As a result therefor, base plate 3 is unaffected by undesirable twisting and bending moments caused by timing belt 7's reaction forces.

3. Since base plate 3 is unaffected by undesirable twisting and bending moments, the requirement of having a high degree of strength in base plate 3 is eliminated. Accordingly this enables the base plate 3 to be made thin, compact and lightweight. It also eliminates the need for special consideration to be given to selecting a mounting position for base plate 3 on cylinder block 6 and at the same time enables the designing of the placement of the other parts on cylinder block 6 to be easier.

In all cases it is understood that the above describedembodiment is merely illustrative of but one of the many possible specific embodiments which can represent applications of the principals of the present invention. Numerous and various other arrangements can be readily devised in accordance with these principals by those skilled in the art without departing from the spirit and scope of the invention.

I claim:

1. A timing belt tensioner for an internal combustion engine comprising:
   a base plate pivotally coupled to the front of said engine;
   a first slot provided in said base plate;
   a tensioner bearing holder disposed on said base plate over said slot;
   a tensioner bearing means coupled to said bearing holder;
   a second slot provided in said bearing holder over said first slot; and
   a bolt means extending through said first and second slots for fixing the position of said timing belt tensioner on said engine; said first and second slots being shaped so as to permit the base plate and tensioner bearing holder to move relative to the bolt means extending through said first and second slots and along an arc having its center of curvature at the pivot axis.

2. The timing belt tensioner according to claim 1 wherein said first and second slots are extended along an arc having its center of curvature at the pivot axis of said base plate.

3. The timing belt tensioner according to claim 1 wherein said base plate is pivotally coupled at one end to the front of said engine by a pin fixed in the front of said engine which extends through a hole in one end of said base plate.

4. A timing belt tensioner according to claim 1 further comprising a spring coupled at one end to the front of said engine and at the other end to said base plate thereby biasing said tensioner bearing against the timing belt of said engine.

5. A timing belt tensioner according to claim 4, wherein said tensioner bearing means comprises;
   an inner ring fixed to said tensioner bearing holder; and
   an outer ring rotatably coupled to said inner ring via ball bearings.

* * * * *